(12) United States Patent
Imafuku et al.

(10) Patent No.: US 7,679,558 B2
(45) Date of Patent: Mar. 16, 2010

(54) TERMINAL DEVICE, POSITIONING METHOD, AND RECORDING MEDIUM

(75) Inventors: Shigeru Imafuku, Shiojiri (JP); Mikio Nagahara, Matsumoto (JP); Shunichi Mizuochi, Matsumoto (JP); Akifumi Hayashi, Azumino (JP); Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 265 days.

(21) Appl. No.: 11/808,687

(22) Filed: Jun. 12, 2007

(65) Prior Publication Data

US 2008/0030402 A1 Feb. 7, 2008

(30) Foreign Application Priority Data

Jun. 15, 2006 (JP) .............................. 2006-166435

(51) Int. Cl.
*G01S 1/00* (2006.01)

(52) U.S. Cl. ................................. 342/357.15

(58) Field of Classification Search ................................. 342/357.01–357.17
See application file for complete search history.

(56) References Cited

U.S. PATENT DOCUMENTS

| | | | |
|---|---|---|---|
| 5,822,384 A | 10/1998 | Thebault et al. | |
| 6,133,873 A | 10/2000 | Krasner | |
| 2005/0253754 A1 | 11/2005 | Mizuochi et al. | |
| 2008/0129585 A1* | 6/2008 | Roh ....................... | 342/357.01 |
| 2008/0252517 A1* | 10/2008 | Fuchs et al. .............. | 342/357.1 |

FOREIGN PATENT DOCUMENTS

| | | |
|---|---|---|
| EP | 0 654 913 A2 | 5/1995 |
| JP | 2005-326281 A | 11/2005 |
| JP | 2006-030114 A | 2/2006 |
| JP | 2006-194912 A | 7/2006 |
| WO | WO 2004/086077 A1 | 10/2004 |
| WO | WO-2006/031672 A2 | 3/2006 |

OTHER PUBLICATIONS

Ward, P.W., GPS Receiver Search Techniques, Position Location and Navigation Symposium, Apr. 22, 1996, pp. 604-611, Atlanta, GA, USA.

* cited by examiner

*Primary Examiner*—Thomas H Tarcza
*Assistant Examiner*—Nga X Nguyen
(74) *Attorney, Agent, or Firm*—Global IP Counselors, LLP

(57) ABSTRACT

A terminal device includes a plurality of search channel sections which search for a positioning satellite, a candidate reception frequency calculation section which calculates a candidate reception frequency of a first acquisition target satellite by causing the search channel sections to perform the correlation accumulation process for a first accumulation time, a candidate frequency confirmation section which confirms reliability of the candidate reception frequency by causing the search channel sections to perform the correlation accumulation process for a second accumulation time longer than the first accumulation time, a final frequency calculation section which calculates a final frequency by causing the search channel sections to perform the correlation accumulation process for a third accumulation time longer than the second accumulation time, and a first difference calculation section which calculates a difference between an estimated synchronization frequency corresponding to each first acquisition target satellite and the final frequency.

6 Claims, 12 Drawing Sheets

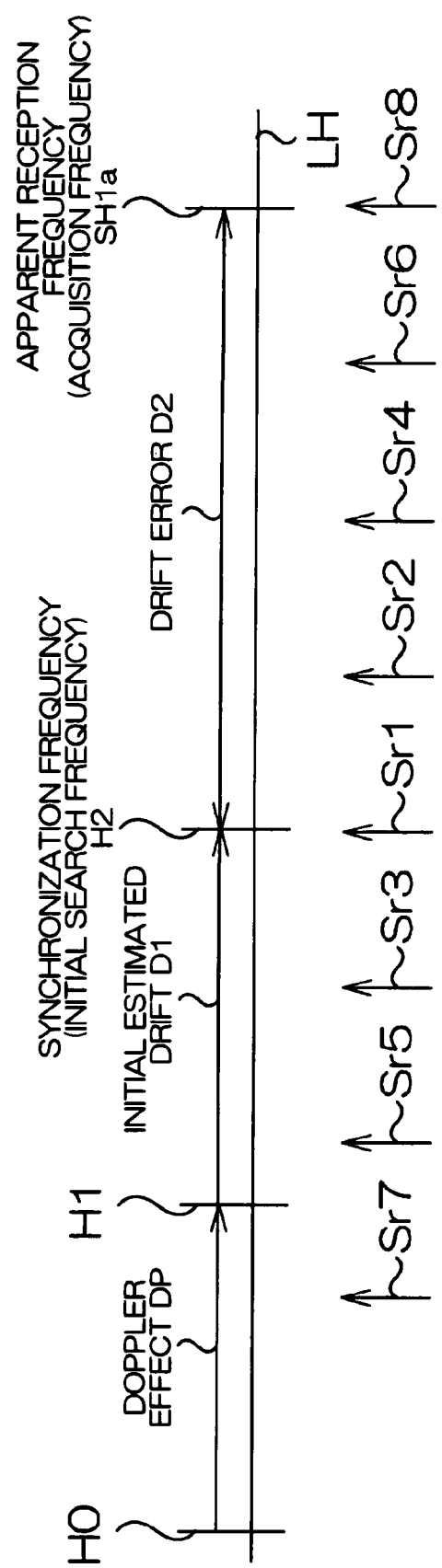

FIG. 10

AVERAGE DRIFT ERROR CALCULATION CONDITION:
ONE OF CONDITIONS 1 TO 4 IS SATISFIED

CONDITION 1: NUMBER OF SATELLITES WITH SNR OF 1 IS ONE OR
                      MORE IN ONE-SECOND ACCUMULATION PROCESS
                      (CANDIDATE FREQUENCY CALCULATION PROCESS)

CONDITION 2: NUMBER OF SATELLITES WITH SNR OF 0.7 IS TWO OR
                      MORE IN ONE-SECOND ACCUMULATION PROCESS
                      (CANDIDATE FREQUENCY CALCULATION PROCESS)

CONDITION 3: NUMBER OF SATELLITES WITH SNR OF 0.7 IS ONE OR
                      MORE IN FOUR-SECOND ACCUMULATION PROCESS
                      (CANDIDATE FREQUENCY CONFIRMATION PROCESS)
                      AND EIGHT-SECOND ACCUMULATION PROCESS
                      (FINAL FREQUENCY CALCULATION PROCESS)
                      HAS BEEN COMPLETED

CONDITION 4: NUMBER OF SATELLITES WITH SNR OF 0.5 IS TWO OR
                      MORE IN FOUR-SECOND ACCUMULATION PROCESS
                      (CANDIDATE FREQUENCY CONFIRMATION PROCESS)
                      AND EIGHT-SECOND ACCUMULATION PROCESS
                      (FINAL FREQUENCY CALCULATION PROCESS)
                      HAS BEEN COMPLETED

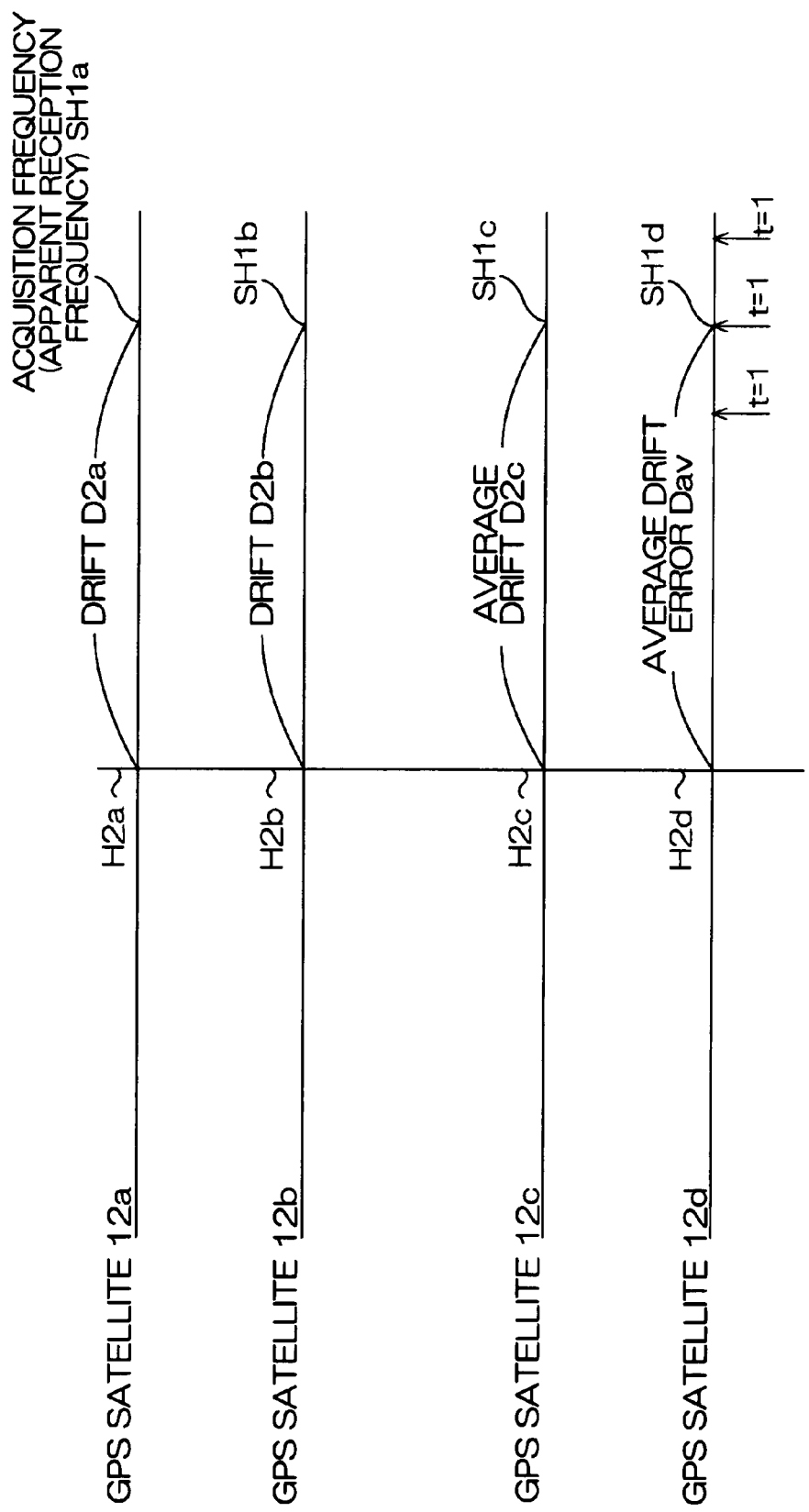

US 7,679,558 B2

TERMINAL DEVICE, POSITIONING METHOD, AND RECORDING MEDIUM

Japanese Patent Application No. 2006-166435 filed on Jun. 15, 2006, is hereby incorporated by reference in its entirety.

BACKGROUND OF THE INVENTION

The present invention relates to a terminal device, a positioning method, and a recording medium.

A positioning system has been used in practice which locates the present position of a GPS receiver utilizing a satellite navigation system using positioning satellites, such as a global positioning system (GPS). The GPS receiver determines the signal frequency (reception signal frequency) of the signal received from the GPS satellite based on GPS satellite orbital information and the like stored in advance, and achieves synchronization with the reception signal frequency using synchronization means included in the GPS receiver to receive the signal from the GPS satellite.

However, since the frequency of a crystal oscillator or the like which generates a reference clock signal for the synchronization means of the GPS receiver changes depending on the temperature (hereinafter called "drift"), the GPS receiver cannot promptly achieve synchronization with the reception signal frequency when no measures are taken, whereby the positioning time is increased.

In order to deal with this problem, technology has been proposed which determines the drift of the GPS receiver by acquiring one positioning satellite as the first acquisition target using all synchronization means and then acquires the positioning satellites necessary for positioning (JP-A-2005-326281).

However, the above technology has a problem in which the period of time required to acquire the positioning satellites necessary for positioning using the calculated drift may be increased depending on the accuracy of the drift. This makes it difficult to sufficiently reduce the period of time required to calculate the located position.

SUMMARY

According to one aspect of the invention, there is provided a terminal device which locates a present position based on signals from a plurality of positioning satellites, the terminal device comprising:

a plurality of search channel sections which search for the positioning satellite while changing an accumulation time of a correlation accumulation process for the signal from the positioning satellite;

a first acquisition target satellite determination section which determines at least one first acquisition target satellite as a first acquisition target;

a candidate reception frequency calculation section which calculates a candidate reception frequency of the first acquisition target satellite determined by the first acquisition target satellite determination section by causing the search channel sections to perform the correlation accumulation process using a first accumulation time;

a candidate frequency confirmation section which confirms reliability of the candidate reception frequency calculated by the candidate reception frequency calculation section by causing the search channel sections to perform the correlation accumulation process using a second accumulation time longer than the first accumulation time;

a final frequency calculation section which calculates a final frequency by causing the search channel sections to perform the correlation accumulation process using a third accumulation time longer than the second accumulation time;

a first difference calculation section which calculates a first difference indicating a difference between an estimated synchronization frequency corresponding to the first acquisition target satellite determined by the first acquisition target satellite determination section and the final frequency; and a necessary-for-positioning satellite acquisition section which acquires the positioning satellite other than the first acquisition target satellite used to calculate the first difference using the first difference calculated by the first difference calculation section.

BRIEF DESCRIPTION OF THE SEVERAL VIEWS OF THE DRAWING

FIG. 3 is a schematic view showing an example of a general method of searching for a GPS satellite.

FIG. 7 is a view showing a correlation cumulative value and the like.

FIG. 8 is a view illustrative of a candidate frequency calculation program and the like.

FIG. 9 is a view illustrative of the candidate frequency calculation program and the like.

FIG. 10 is a view illustrative of an average drift error calculation program.

FIG. 11 is a view illustrative of a necessary-for-positioning satellite acquisition program.

DETAILED DESCRIPTION OF THE EMBODIMENT

Figure 1:
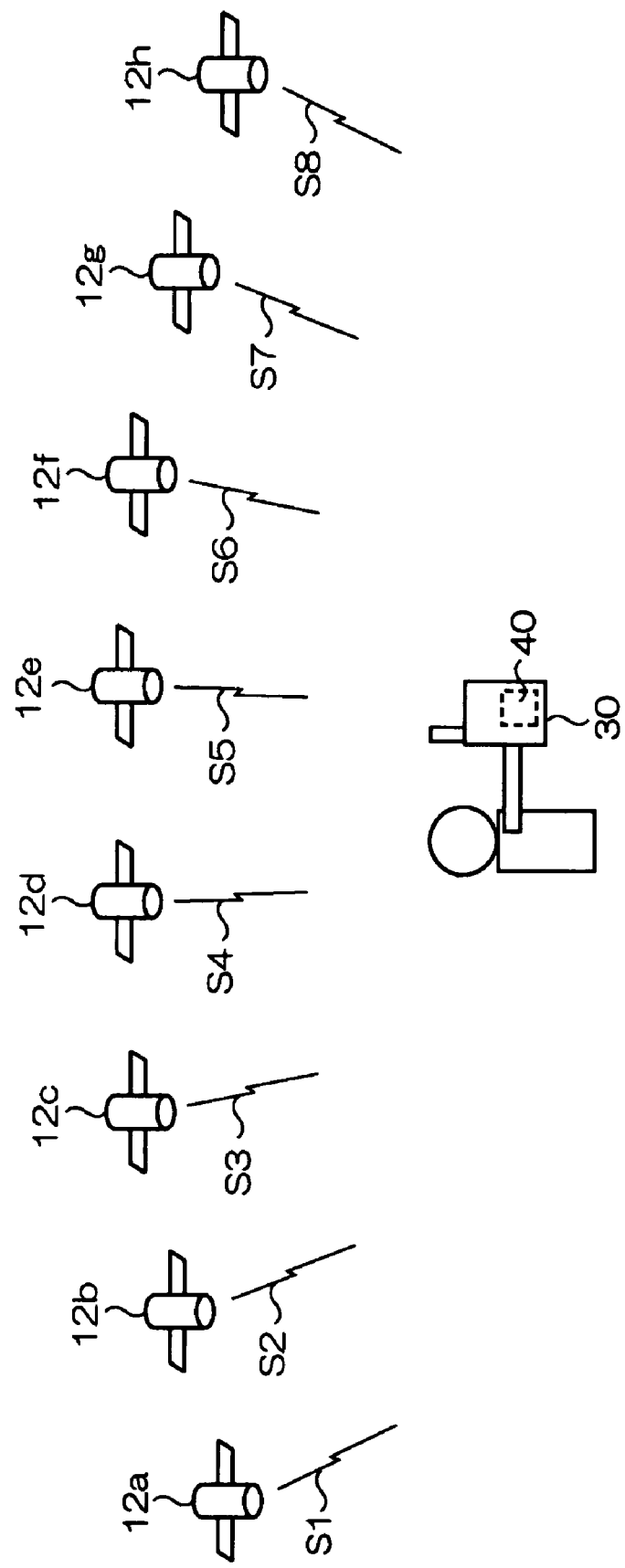
FIG. 1 is a schematic view showing a terminal and the like according to one embodiment of the invention.

An objective of the present invention is to calculate the drift with high accuracy and more promptly acquire the positioning satellite to locate the position.

According to one embodiment of the invention, there is provided a terminal device which locates a present position based on signals from a plurality of positioning satellites, the terminal device comprising:

a plurality of search channel sections which search for the positioning satellite while changing an accumulation time of a correlation accumulation process for the signal from the positioning satellite;

a first acquisition target satellite determination section which determines at least one first acquisition target satellite as a first acquisition target;

a candidate reception frequency calculation section which calculates a candidate reception frequency of the first acquisition target satellite determined by the first acquisition target satellite determination section by causing the search channel sections to perform the correlation accumulation process using a first accumulation time;

a candidate frequency confirmation section which confirms reliability of the candidate reception frequency calculated by the candidate reception frequency calculation section by causing the search channel sections to perform the correlation accumulation process using a second accumulation time longer than the first accumulation time;

a final frequency calculation section which calculates a final frequency by causing the search channel sections to perform the correlation accumulation process using a third accumulation time longer than the second accumulation time;

a first difference calculation section which calculates a first difference indicating a difference between an estimated synchronization frequency corresponding to the first acquisition target satellite determined by the first acquisition target satellite determination section and the final frequency; and a necessary-for-positioning satellite acquisition section which acquires the positioning satellite other than the first acquisition target satellite used to calculate the first difference using the first difference calculated by the first difference calculation section.

According to the above configuration, since the terminal device includes the candidate reception frequency calculation section, the terminal device can calculate the candidate reception frequency of the first location target satellite.

Since the terminal device includes the candidate frequency confirmation section, the terminal device can confirm the reliability of the candidate reception frequency.

Moreover, since the terminal device includes the final frequency calculation section, the terminal device can calculate the final frequency.

The final frequency has high accuracy because the final frequency is calculated using the third accumulation time longer than the first accumulation time and the second accumulation time after the reliability of the candidate reception frequency has been confirmed.

This increases the accuracy of the first difference, whereby the positioning satellite other than the first acquisition target satellite can be promptly acquired using the first difference.

This makes it possible to calculate the drift with high accuracy and more promptly acquire the positioning satellite to locate the position.

The terminal device may comprise:

a candidate reception frequency recalculation section which recalculates the candidate reception frequency of the first acquisition target satellite when the candidate frequency confirmation section has confirmed that the candidate reception frequency is not reliable by causing the search channel sections to perform the correlation accumulation process using a fourth accumulation time longer than the first accumulation time.

According to the above configuration, since the candidate reception frequency can be recalculated using the fourth accumulation time when the candidate frequency is not reliable, the candidate reception frequency more reliable than the first candidate frequency can be calculated.

In the terminal device, the first acquisition target satellite determination section may determine a plurality of the first acquisition target satellites.

In the terminal device, the first acquisition target satellite determination section may determine a plurality of the first acquisition target satellites;

the first difference calculation section may calculate the first difference for each of the first acquisition target satellites;

the terminal device may include an average difference calculation section which calculates an average value of the first differences calculated for the first acquisition target satellites; and the necessary-for-positioning satellite acquisition section may acquire the positioning satellite using the average value of the first differences calculated by the average difference calculation section.

According to the above configuration, the terminal device can acquire the positioning satellite other than the first acquisition target satellites based on the average difference.

Since the average difference is the average value of the first differences, errors of the first differences are reduced. Therefore, the average difference accurately represents the drift of the terminal device in comparison with the first difference.

As a result, the terminal device can more promptly acquire the positioning satellite using the average difference.

According to another embodiment of the invention, there is provided a positioning method of locating a present position based on signals from a plurality of positioning satellites by searching for the positioning satellites using a plurality of search channel sections which search for the positioning satellite while changing an accumulation time of a correlation accumulation process for the signal from the positioning satellite, the method comprising:

a first acquisition target satellite determination step of determining at least one first acquisition target satellite as a first acquisition target;

a candidate reception frequency calculation step of calculating a candidate reception frequency of the first acquisition target satellite by causing the search channel sections to perform the correlation accumulation process using a first accumulation time;

a candidate frequency confirmation step of confirming reliability of the candidate reception frequency by causing the search channel sections to perform the correlation accumulation process using a second accumulation time longer than the first accumulation time;

a final frequency calculation step of calculating a final frequency by causing the search channel sections to perform the correlation accumulation process using a third accumulation time longer than the second accumulation time;

a first difference calculation step of calculating a first difference indicating a difference between an estimated synchronization frequency corresponding to the first acquisition target satellite determined by the first acquisition target satellite determination step and the final frequency; and a necessary-for-positioning satellite acquisition step of acquiring the positioning satellite other than the first acquisition target satellite used to calculate the first difference using the first difference.

The above configuration makes it possible to calculate the drift with high accuracy and more promptly acquire the positioning satellite to locate the position.

According to a further embodiment of the invention, there is provided a computer-readable recording medium having recoded thereon a program for causing a computer to locate a present position based on signals from a plurality of positioning satellites by causing a plurality of search channel sections to search for the positioning satellites while changing an accumulation time of a correlation accumulation process for the signal from the positioning satellite, the program causing the computer to execute:

a first acquisition target satellite determination step of determining at least one first acquisition target satellite as a first acquisition target;

a candidate reception frequency calculation step of calculating a candidate reception frequency of the first acquisition target satellite by causing the search channel sections to perform the correlation accumulation process using a first accumulation time;

a candidate frequency confirmation step of confirming reliability of the candidate reception frequency by causing the search channel sections to perform the correlation accumulation process using a second accumulation time longer than the first accumulation time;

a final frequency calculation step of calculating a final frequency by causing the search channel sections to perform the correlation accumulation process using a third accumulation time longer than the second accumulation time;

a first difference calculation step of calculating a first difference indicating a difference between an estimated synchronization frequency corresponding to the first acquisition target satellite determined by the first acquisition target satellite determination step and the final frequency; and a necessary-for-positioning satellite acquisition step of acquiring the positioning satellite other than the first acquisition target satellite used to calculate the first difference using the first difference.

Preferred embodiments of the invention are described below in detail with reference to the drawings.

The following embodiments illustrate specific preferred embodiments of the invention and are provided with various technologically preferred limitations. Note that the scope of the invention is not limited to the following embodiments unless there is a description limiting the invention.

FIG. 1 is a schematic view showing a terminal 30 and the like according to this embodiment.

As shown in FIG. 1, the terminal 30 includes a GSP device 40. The terminal 30 exemplifies a terminal device. The terminal 30 can locate the present position using the GSP device 40 based on signals S1, S2, S3, S4, S5, S6, S7, and S8 from GPS satellites 12a, 12b, 12c, 12d, 12e, 12f, 12g, and 12h (positioning satellites), for example. The signals S1 and the like exemplify signals.

The GPS satellites 12a to 12h exemplify GPS satellites observable from the present position of the terminal 30. In this embodiment, the GPS satellite is used as an example of the positioning satellite. Note that the positioning satellite is not limited to the GPS satellite insofar as the positioning satellite is a satellite positioning system (SPS) satellite.

The terminal 30 may be a portable telephone, for example. The terminal 30 may be a personal handy-phone system (PHS), a personal digital assistance (PDA), or the like.

(Main Hardware Configuration of Terminal 30)

Figure 2:
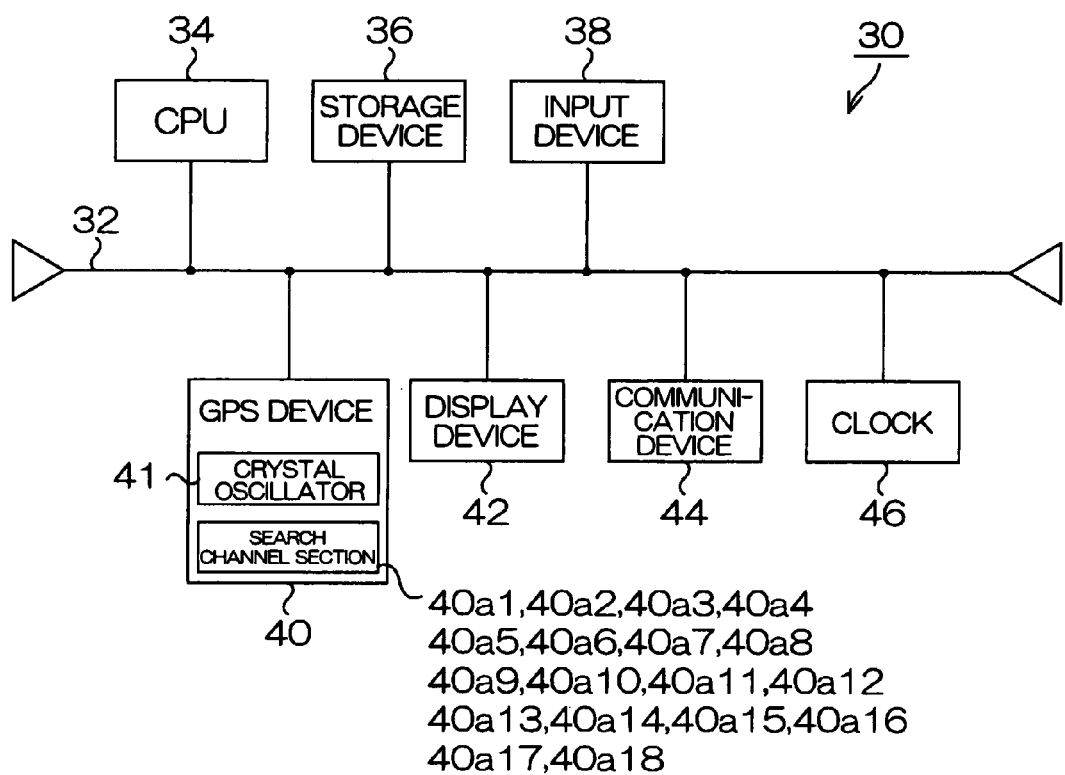
FIG. 2 is a schematic view showing the main hardware configuration of the terminal.

FIG. 2 is a schematic view showing the main hardware configuration of the terminal 30.

As shown in FIG. 2, the terminal 30 includes a computer which includes a bus 32, for example. A central processing unit (CPU) 34 and a storage device 36 are connected with the bus 32. The CPU 34 is a control section which performs a process based on a specific program and controls the storage device 36 and the like connected with the bus 32. The storage device 36 is a random access memory (RAM), a read only memory (ROM), or the like.

A display device 42 for displaying various types of information is connected with the bus 32. A communication device 44 for communication through a base station and a communication network (not shown) is also connected with the bus 32.

The above-mentioned GPS device 40 is also connected with the bus 32.

As shown in FIG. 2, the GPS device 40 includes an oscillator such as a crystal oscillator 41 which generates a signal with a frequency used as a reference to generate a synchronization frequency for acquiring the GPS satellites 12a and the like (see FIG. 1).

The GPS device 40 includes search channel sections 40a1 to 40a18 as search channel sections which search for the GPS satellites 12a and the like, for example. The search channel sections 40a1 and the like are configured to generate a synchronization frequency described later by modulating a frequency produced by the oscillation of the crystal oscillator 41, and search for the GPS satellites 12a and the like using the generated synchronization frequency. Specifically, the search channel sections 40a1 and the like are configured to acquire the GPS satellites 12a and the like by changing the synchronization frequency to achieve synchronization with the frequencies of the signals S1 and the like from the GPS satellites 12a and the like (see FIG. 1).

The search channel sections 40a1 and the like are correlators for performing a correlation process of coarse and access (C/A) codes contained in the signals S1 and the like from the GPS satellites 12a and the like and a C/A code replica generated by the GPS device 40 to specify the phase of the C/A code (see paragraph 0027 of JP-T-2004-501352, for example). It is necessary to achieve frequency synchronization in order to efficiently perform the correlation process. This specification describes frequency synchronization necessary for performing the correlation process.

The search channel sections 40a1 to 40a18 are also used to track the GPS satellites 12a and the like after acquiring the GPS satellites 12a and the like.

The term "frequency search" is used synonymously with the term "search for the GPS satellites 12a and the like".

Each of the search channel sections 40a1 and the like can use one frequency at one time.

Therefore, the GPS device 40 including the eighteen search channel sections 40a1 and the like in total can use eighteen frequencies at the same time, for example.

The search method using the GPS device 40 is described below.

FIG. 3 is a schematic view showing an example of a general method of searching for the GPS satellites 12a and the like.

In order to obtain the signals from the GPS satellites 12a and the like, it is necessary to cause the synchronization frequency of the GPS receiver to coincide with the frequency of each satellite. The frequencies of the signals S1 and the like transmitted from the GPS satellite 12a and the like may differ from the frequency of the signal from each satellite received by the GPS receiver, as described below, due to the Doppler effect caused by a relative positional change between each satellite and the GPS receiver and a change in frequency of the crystal oscillator 41 which generates the synchronization frequency of the GPS receiver.

For example, a point H0 (see FIG. 3) on a straight line LH indicating the frequency indicates the frequency of the signal S1 transmitted from the GPS satellite 12a shown in FIG. 1. The signal S1 has a frequency H1 at the position of the GPS receiver due to a Doppler effect DP.

However, the GPS receiver does not necessarily recognize the signal S1 as a signal with the frequency H1.

This is because the GPS device 40 recognizes that the signal S1 has a frequency SH1a due to a change in frequency generated by the GPS receiver, as described above. Specifically, the frequency SH1a is not the true frequency of the signal S1 at the position of the GPS receiver, but is an apparent reception frequency recognized by the GPS receiver. It is necessary for the GPS receiver to achieve synchronization with the apparent reception frequency SH1a in order to search for the signal S1. In other words, the GPS receiver has acquired the signal S1 when the GPS receiver has achieved synchronization with the apparent reception frequency SH1a. Therefore, the apparent reception frequency SH1a is also called an acquisition frequency.

The above-mentioned change in frequency of the GPS receiver is generally called a drift. Specifically, the term "drift" refers to the difference between the frequency H1, into which the frequency H0 has changed due to the Doppler effect DP, and the acquisition frequency SH1a.

The change (hereinafter called "entire drift") from the frequency H1 to the frequency SH1a is caused by the GPS receiver. As shown in FIG. 3, the entire drift includes an initial estimated drift D1 which is a change in frequency estimated in advance, and a drift error D2. The detailed meaning of the drift is described later.

When the receiver holds data obtained by measuring the relationship between a change in temperature and a change of frequency in advance, the initial estimated drift D1 can be estimated using the data. The entire drift during the preceding positioning may be used as the initial estimated drift D1.

When the GPS receiver starts positioning, the GPS receiver has estimated and held information indicating the initial estimated drift D1, but cannot determine the drift error D2. Therefore, the GPS receiver starts searching for the signal using a frequency H2 as the synchronization frequency taking the Doppler effect DP and the initial estimated drift D1 into consideration. The synchronization frequency is also called an initial search frequency.

The GPS receiver searches for the signal using a plurality of frequencies around the synchronization frequency H2 such as the first search Sr1, the second search Sr2, and the third search Sr3. For example, the frequency coincides with the frequency SH1a in the eighth search Sr8. Since the frequency searches Sr1 and the like are performed at intervals of a specific frequency width (hereinafter also called "step") such as 100 Hz, the frequency generally does not exactly coincide with the frequency SH1a in the eighth search Sr8. However, since the correlation value between the C/A code contained in the signals S1 and the like and the C/A code replica generated by the GPS device 40 becomes equal to or greater than a specific threshold value by making the synchronization frequency of the GPS receiver approximate to the frequency SH1a, the phase of the C/A code can be specified and used for positioning.

The above-mentioned drift is described below in detail.

Figure 4A:
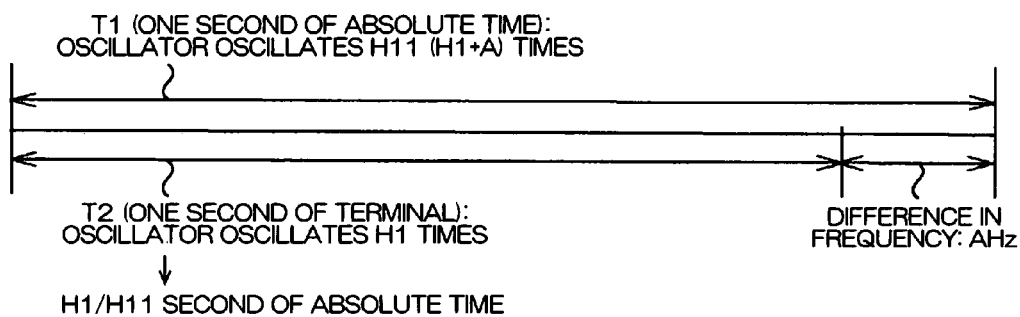
FIGS. 4A and 4B are schematic views illustrative of a drift.
Figure 4B:
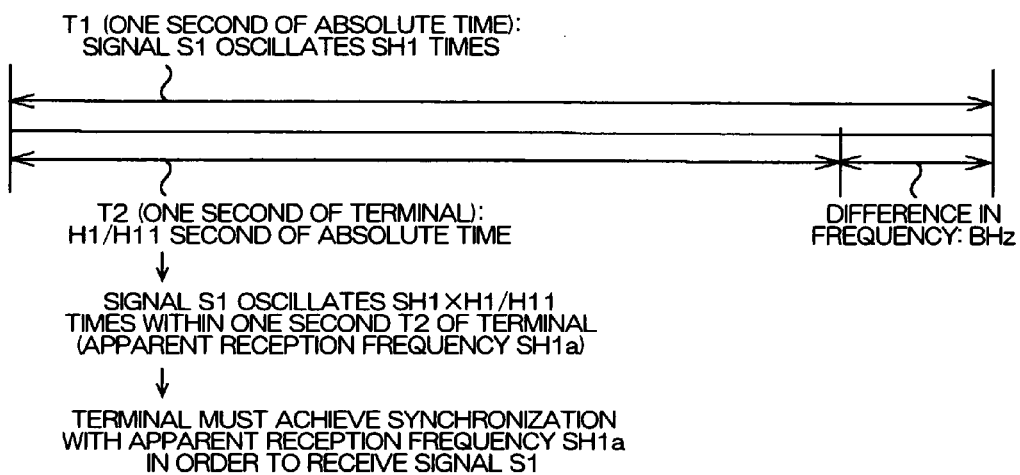

FIGS. 4A and 4B are schematic views illustrative of the drift.

The difference between the absolute time for the GPS satellites 12a and the like and the time for the terminal 30 including the GPS device 40 is described below with reference to FIG. 4A.

The specification frequency of the crystal oscillator 41 shown in FIG. 2 is H1 (e.g. $27.456 \times 10^6$) times per T1 second (one second of absolute time) when the atmospheric temperature is 25° C., for example. Specifically, the specification frequency of the crystal oscillator 41 is H1 Hz. This means that the GPS device 40 regards H1 oscillations of the crystal oscillator 41 as one second. One second for the GPS device 40 is equal to one second T1 of the absolute time as long as the crystal oscillator 41 maintains the specification frequency of H1 Hz.

However, the oscillation performance of the crystal oscillator 41 may change due to a change in atmospheric temperature. For example, the frequency of the crystal oscillator 41 may change by A (e.g. 10 Hz), whereby the crystal oscillator 41 may oscillate H1 times before expiration of the T1 second, as shown in FIG. 4A. In this case, the crystal oscillator 41 oscillates H1+A (H11) times within the T1 second. Specifically, H11 oscillations correspond to one second (T1) of the absolute time.

On the other hand, one second for the GPS device 40 has elapsed when the crystal oscillator 41 has oscillated H1 times. This means that one second for the GPS device 40 is T2 which is H1/H11 of the T1 second of the absolute time. When H1 is $27.456 \times 10^6$ and A is 10, one second T2 for the GPS device 40 corresponds to 0.999999636 (H1/H11) seconds of the absolute time.

The above difference between the time for the GPS device 40 and the absolute time causes a difference between the frequency of the signal at the position of the GPS device 40 and the frequency recognized by the GPS device, as described below.

The drift is described below with reference to FIG. 4B.

Although the frequency also changes due to the Doppler effect, the following description focuses on the change in frequency caused by the crystal oscillator 41.

As shown in FIG. 4B, the signal S1 from the GPS satellite 12a oscillates SH1 (e.g. $1575.42 \times 10^6$) times per second at the position of the terminal 30. Specifically, the frequency of the signal S1 is SH1 Hz at the position of the terminal 30.

However, the signal S1 oscillates only SH1×T2 (e.g. $1575.419-426 \times 10^6$) times per second T2 for the GPS device 40 described with reference to FIG. 4A. Specifically, the signal S1 which oscillates SH1 times per second T1 of the absolute time oscillates only SH1×T2 times per second T2 for the GPS device 40.

Specifically, a difference B occurs between the frequency of the signal S1 per second T1 of the absolute time and the frequency per second T2 recognized by the GPS device 40.

The difference B in frequency is generally called a drift or a drift amount.

In order for the GPS device 40 to search for the signal S1 and acquire the satellite 12a, it is necessary for the GPS device 40 to search for a signal with a frequency of SH1×T2 Hz per second T2 for the GPS device 40 instead of a signal with a frequency of SH1 Hz which is the frequency of the signal S1 per second T1 of the absolute time. Specifically, the GPS device 40 must search for a signal with the apparent reception frequency SH1a.

The terminal 30 searches for a signal with the apparent reception frequency SH1a utilizing the above-described main hardware configuration and the main software configuration and the like described below.

(Main Software Configuration of Terminal 30)

Figure 5:
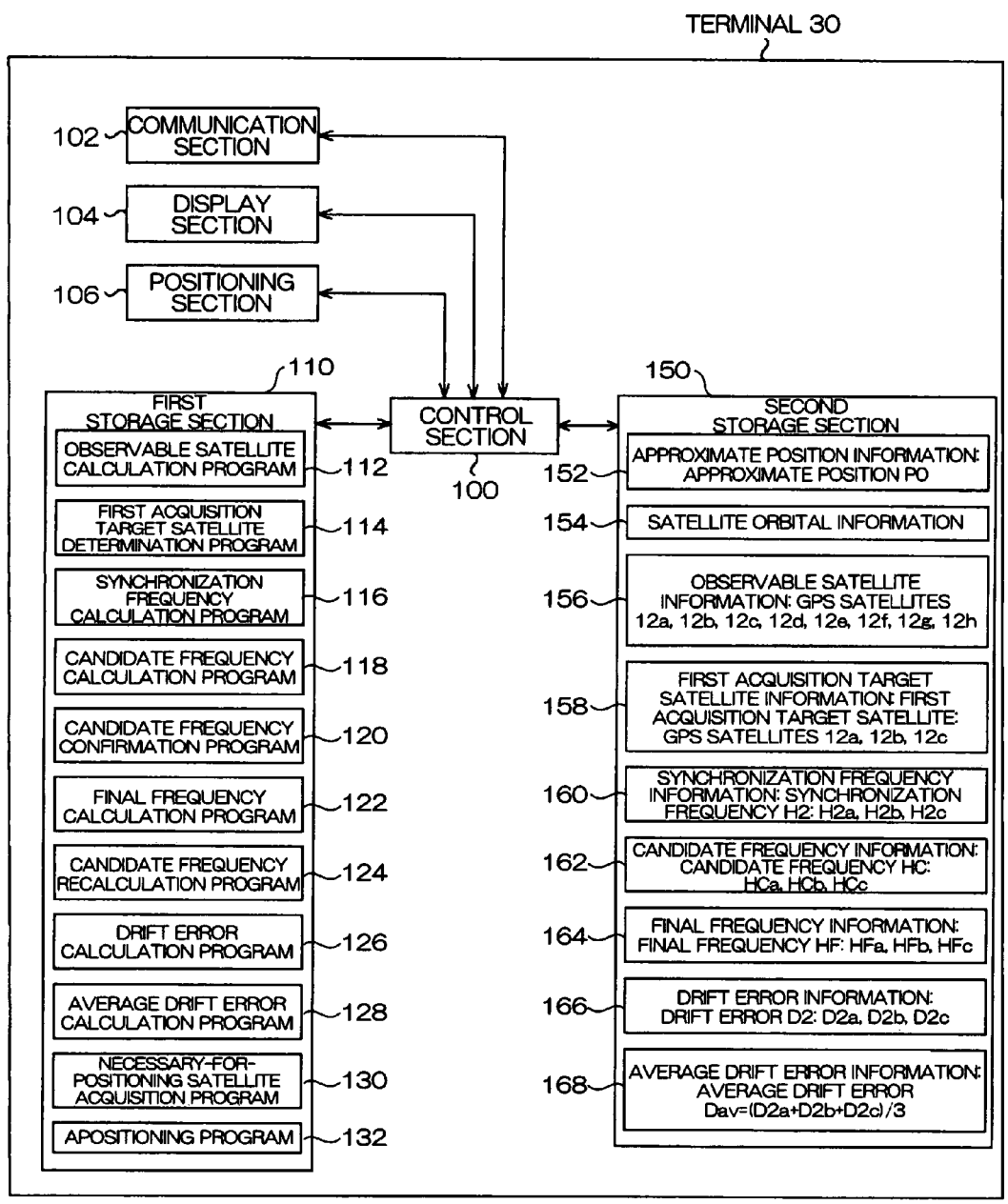
FIG. 5 is a schematic view showing the main software configuration and the like of the terminal.

FIG. 5 is a schematic view showing the main software configuration and the like of the terminal 30.

As shown in FIG. 5, the terminal 30 includes a communication section 102 corresponding to the communication device 44 shown in FIG. 2, a display section 104 corresponding to the display device 42, and a positioning section 106 corresponding to the GPS device 40.

The terminal 30 also includes a control section 100 which controls each section.

The terminal 30 also includes a first storage section 110 which stores various programs, and a second storage section 150 which stores various types of information.

As shown in FIG. 5, the terminal 30 stores approximate position information 152 in the second storage section 150. The approximate position information 152 is information indicating an approximate position P0 of the terminal 30. The approximate position P0 is the position located during the preceding positioning, for example.

As shown in FIG. 5, the terminal 30 stores satellite orbital information 154 in the second storage section 150. The satellite orbital information 154 includes an almanac indicating the approximate orbits of all of the GPS satellites 12a and the like, and an ephemeris indicating the precise orbit of each of the GPS satellites 12a and the like. The terminal 30 decodes the signals S1 and the like to obtain the almanac and the ephemeris, for example.

As shown in FIG. 5, the terminal 30 stores an observable satellite calculation program 112 in the first storage section 110. The observable satellite calculation program 112 is a program for causing the control section 100 to determine the GPS satellites 12a and the like observable from the approximate position P0.

In more detail, the control section 100 determines the GPS satellites 12a and the like which can be observed from the approximate position P0 at the present time referring to the almanac included in the satellite orbital information 154.

In this embodiment, the observable GPS satellites 12a and the like are the GPS satellites 12a to 12h, for example.

The control section 100 stores observable satellite information 156 indicating the observable GPS satellites 12a and the like in the second storage section 150.

As shown in FIG. 5, the terminal 30 stores a first acquisition target satellite determination program 114 in the first storage section 110. The first acquisition target satellite determination program 114 is a program for causing the control section 100 to determine the first search/acquisition target GPS satellite (first acquisition target satellite) selected from the GPS satellites 12a and the likes shown in FIG. 1. Specifically, the first acquisition target satellite determination program 114 and the control section 100 exemplify a first acquisition target satellite determination section which determines the first acquisition target satellite selected from the GPS satellites 12a and the like.

In more detail, the control section 100 calculates the angle of elevation and the like of each of the GPS satellites 12a and the like based on the approximate position information 152 and the almanac or the ephemeris included in the satellite orbital information 154 stored in the second storage section 150, and determines at least one GPS satellite expected to be promptly acquired to be the first acquisition target satellite. The control section 100 preferably determines a plurality of GPS satellites to be the first acquisition target satellites.

For example, the control section 100 determines two GPS satellites 12a and 12b with an angle of elevation of 45 degrees or more to be the first acquisition target satellites. An angle of elevation of 45 degrees or more is specified in advance as a range which provides a good reception environment such as elimination of multipaths. The following description is given on the assumption that the first acquisition target satellites are three GPS satellites 12a, 12b, and 12c.

The control section 100 stores first acquisition target satellite information 158 indicating the first acquisition target satellite in the second storage section 150.

For example, when only the GPS satellite 12a has an angle of elevation equal to or greater than the angle of elevation threshold value, the control section 100 reduces the angle of elevation threshold value (e.g. 30 degrees) to determine at least one of the remaining GPS satellites 12b and the like to be the first acquisition target satellite.

As shown in FIG. 5, the terminal 30 stores a synchronization frequency calculation program 116 in the first storage section 110. The synchronization frequency calculation program 116 is a program for causing the control section 100 to calculate the synchronization frequency for each of the GPS satellites 12a and the like based on the frequency of each of the signals S1 and the like transmitted from the GPS satellites 12a and the like, the Doppler effect DP (see FIG. 3) which differs depending on the GPS satellites 12a and the like, and the initial estimated drift D1 (see FIG. 3) common to the GPS satellites 12a and the like (first acquisition target satellites). The synchronization frequency calculated by the control section 100 based on the synchronization frequency calculation program 116 exemplifies an estimated synchronization frequency.

The control section 100 stores synchronization frequency information 160 indicating the synchronization frequency in the second storage section 150.

Note that the synchronization frequency may be set based on only the frequencies of the signals S1 and the like when transmitted and the Doppler effect, differing from this embodiment. Specifically, the frequency H1 shown in FIG. 3 may be set to be the synchronization frequency.

As shown in FIG. 5, the terminal 30 stores a candidate frequency calculation program 118 in the first storage section 110. The candidate frequency calculation program 118 is a program for causing the control section 100 to calculate a candidate frequency HC of the first acquisition target satellite using a first accumulation time (e.g. one second (s)) using the search channel sections 40a1 and the like. The candidate frequency HC exemplifies a candidate reception frequency. The candidate frequency calculation program 118 and the control section 100 exemplify a candidate reception frequency calculation section.

The control section 100 allocates the search channel sections 40a1 to 40a3 to the GPS satellite 12a, allocates the search channel sections 40a4 to 40a6 to the GPS satellite 12b, and allocates the search channel sections 40a7 to 40a9 to the GPS satellite 12c according to the first acquisition target satellite determination program 118, and acquires the GPS satellites 12a, 12b, and 12c.

Note that the term "acquisition of the GPS satellites 12a and the like" is used synonymously with the term "reception of the signals S1 and the like from the GPS satellites 12a and the like".

The control section 100 performs the correlation process between the C/A code contained in the signals S1 and the like and the C/A code replica generated by the terminal 30 when acquiring the GPS satellites 12a and the like.

Figure 6:
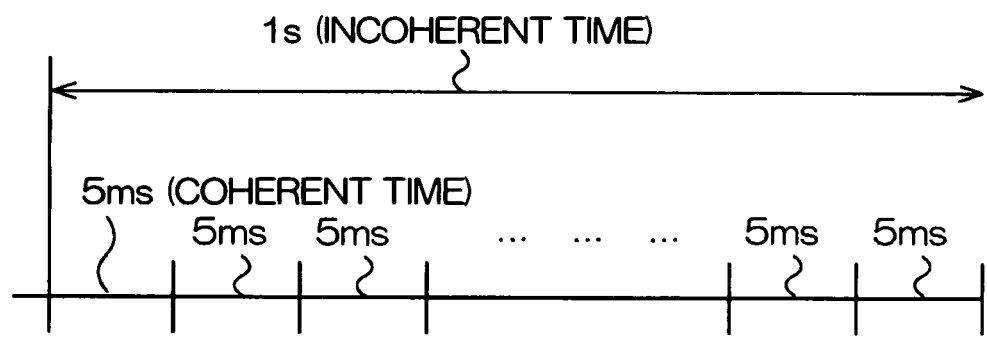
FIG. 6 is a view illustrative of a correlation process.

FIG. 6 is a view illustrative of the correlation process.

A coherent process is a process of correlating the C/A code received by the terminal 30 with the C/A code replica. The C/A code replica is a code generated by the terminal 30.

For example, when the coherent time is 5 msec, as shown in FIG. 6, the correlation value between the C/A code synchronously accumulated over 5 msec and the C/A code replica is calculated. The code phase and the correlation value are output as a result of the coherent process.

An incoherent process is a process of calculating a correlation cumulative value (incoherent value) by accumulating the correlation values as the coherent results. The incoherent time (accumulation time) is one second (s), for example. The incoherent time is synonymous with the accumulation time.

The code phase output by the coherent process and the correlation cumulative value are output as a result of the correlation process.

Figure 7:
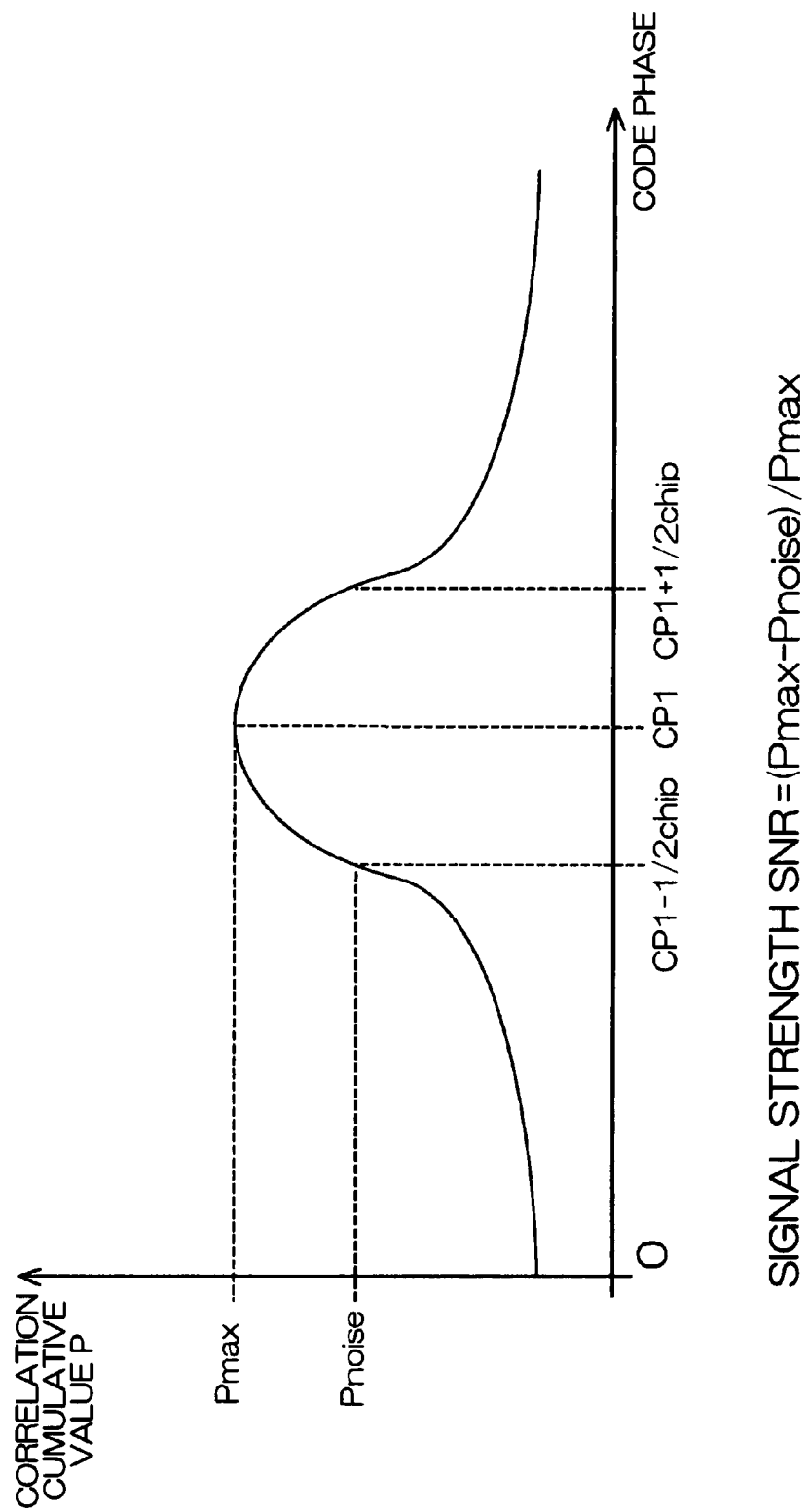

FIG. 7 is a view showing an example of the relationship between the correlation cumulative value and the code phase.

A code phase CP1 corresponding to the maximum correlation cumulative value Pmax shown in FIG. 7 is the code phase of the C/A code (equal to the code phase of the C/A code replica).

The terminal 30 sets the correlation cumulative value of one of the code phases at an interval of half of a chip from the code phase CP1 having a larger correlation cumulative value to be a correlation cumulative value Pnoise of noise, for example.

The terminal 30 specifies a value obtained by dividing the difference between the correlation cumulative values Pmax and Pnoise by the correlation cumulative value Pmax as the signal strength SNR (signal to noise ratio). Specifically, the term "signal strength SNR" is defined as a value obtained by dividing the difference between the correlation cumulative values Pmax and Pnoise by the correlation cumulative value Pmax.

Figure 8:
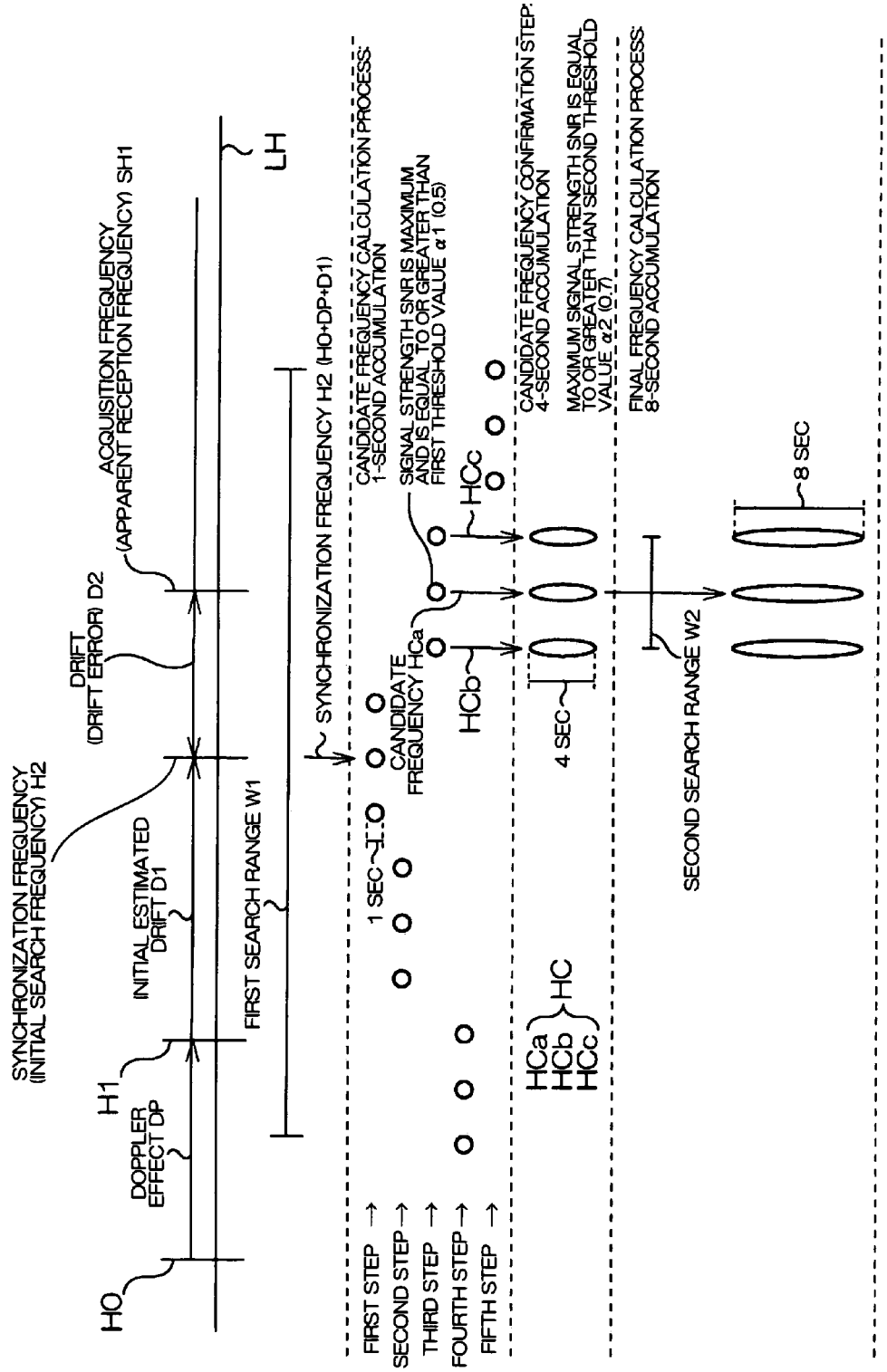

FIG. 8 is a view illustrative of the candidate frequency calculation program 118 and the like.

A case of acquiring the GPS satellite 12*a* is described below.

As shown in FIG. 8, the control section 100 specifies a specific frequency range around the synchronization frequency H2 as a first search range W1. The first search range W1 is statistically specified as a frequency range in which the acquisition frequency SH exists.

As shown in FIG. 8, the control section 100 respectively allocates the frequencies to three search channel sections, and performs the one-second correlation process. This process is called a candidate frequency calculation process. For example, a first-step accumulation process is performed while allocating the synchronization frequency H2 to the search channel section 40*a*1, allocating a frequency lower than the synchronization frequency H2 by 50 Hz to the search channel section 40*a*2, and allocating a frequency higher than the synchronization frequency H2 by 50 Hz to the search channel section 40*a*3.

A second-step accumulation process is performed after the first-step accumulation process. The control section 100 similarly performs a third-step accumulation process to a fifth-step accumulation process. The accumulation time for each accumulation process is one second (s).

For example, the first search range W1 can be sought by the first-step accumulation process to the fifth-step accumulation process at frequency intervals of 50 Hz.

Note that the control section 100 performs the correlation process at each frequency while changing the code phase (description thereof is omitted).

The control section 100 calculates a frequency HCa corresponding to the correlation process in which the signal strength SNR is maximum and is equal to or greater than a first threshold value $\alpha 1$, and frequencies (HCb and HCc) higher or lower than the frequency HCa by 50 Hz as the candidate frequencies HC. The candidate frequency HC exemplifies a candidate reception frequency.

When the frequency HCa is a frequency corresponding to the correlation process in which the signal strength SNR is maximum and is equal to or greater than the first threshold value $\alpha 1$, the candidate frequency HCb is a frequency lower than the frequency HCa by 50 Hz, and the candidate frequency HCc is a frequency higher than the frequency HCa by 50 Hz. The candidate frequencies HCa, HCb, and HCc are generically called a candidate frequency HC. The first threshold value $\alpha 1$ is 0.5, for example.

The control section 100 stores candidate frequency information 162 indicating the candidate frequency HC in the second storage section 150.

When the maximum signal strength SNR is less than the first threshold value $\alpha 1$, the control section 100 performs the above candidate frequency calculation process using an accumulation time of four seconds (s). The control section 100 continuously performs the candidate frequency calculation process until the maximum signal strength SNR becomes equal to or greater than the first threshold value $\alpha 1$.

As shown in FIG. 5, the terminal 30 stores a candidate frequency confirmation program 120 in the first storage section 110. The candidate frequency confirmation program 120 is a program for causing the control section 100 to confirm the reliability of the candidate frequency HC using a second accumulation time longer than the first accumulation time using the search channel sections 40*a*1 and the like. The candidate frequency confirmation program 120 and the control section 100 exemplify a candidate reception frequency confirmation section.

The second accumulation time is four seconds (s), for example.

The control section 100 confirms that the candidate frequency HC is actually the frequency of the signal S1 from the GPS satellite 12*a* based on the candidate frequency confirmation program 120 using the method shown in FIG. 8. This process is called a candidate frequency confirmation process.

In more detail, the control section 100 performs the correlation process at the candidate frequencies HCa, HCb, and HCc.

The control section 100 performs the correlation process not only at the candidate frequency HCa but also at the frequencies higher or lower than the frequency HCa by 50 Hz because the candidate frequency HC may be erroneously calculated, even if the GPS device 40 receives a direct wave from the signal S1. In other words, the control section 100 performs the correlation process not only at the candidate frequency HCa but also at the frequencies higher or lower than the frequency HCa by 50 Hz taking into consideration errors which may occur when calculating the candidate frequency HCa.

When one of the three frequencies with the maximum signal strength SNR is equal to greater than a second threshold value $\alpha 2$, the control section 100 determines that the candidate frequency HC is the direct-wave reception frequency of the signal S1 and has sufficient reliability. The second threshold value $\alpha 2$ is set to be larger than the first threshold value $\alpha 1$. The second threshold value $\alpha 2$ is 0.7, for example.

When the candidate frequency HC is not the frequency of the signal S1 but the frequency of an interference wave, the signal strength SNR does not reach the second threshold value $\alpha 2$, even if the correlation process is performed using the second accumulation time.

On the other hand, when the candidate frequency HC is the frequency of the signal S1, the signal strength SNR reaches the second threshold value $\alpha 2$ by performing the correlation process for the second accumulation time.

Therefore, the control section 100 can confirm the reliability of the candidate frequency HC depending on whether or not the candidate frequency HC with the maximum signal strength SNR is equal to or greater than the second threshold value $\alpha 2$. When the maximum signal strength SNR is less than the second threshold value $\alpha 2$, the control section 100 continuously performs the candidate frequency confirmation process around the candidate frequency HCa while maintaining the accumulation time at four seconds (s). The control section 100 continuously performs the candidate frequency confirmation process until the maximum signal strength SNR becomes equal to or greater than the second threshold value $\alpha 2$.

As shown in FIG. 5, the terminal 30 stores a final frequency calculation program 122 in the first storage section 110. The final frequency calculation program 122 is a program for causing the control section 100 to calculate a final frequency HF using a third accumulation time longer than the second accumulation time using the search channel sections 40*a*1 and the like. The final frequency HF exemplifies a final frequency. The final frequency calculation program 122 and the control section 100 exemplify a final frequency calculation section.

The third accumulation time is eight seconds (s), for example.

The control section 100 specifies a second search range W2, as shown in FIG. 8. The second search range W2 is a frequency range narrower than the first search range W1. The second search range W2 is specified as a range around the candidate frequency HC with the maximum signal strength SNR by less than 50 Hz.

In FIG. 8, the control section 100 specifies the second search range W2 around the candidate frequency HCa.

The control section 100 performs the correlation process within the second search range W2 at the frequency HCa and frequencies higher or lower than the candidate frequency HCa by 30 Hz, for example. The control section 100 calculates the frequency with the maximum signal strength SNR as the final frequency HF. This process is called a final frequency calculation process.

The control section 100 stores final frequency information 164 indicating the final frequency HF in the second storage section 150.

When the electric field is weak (e.g. −140 dBm or less), the accumulation time in the candidate frequency calculation process may be initially set at four seconds (s), and the accumulation time in the candidate frequency confirmation process may be initially set at eight seconds (s).

As shown in FIG. 5, the terminal 30 stores a candidate frequency recalculation program 124 in the first storage section 110. The candidate frequency recalculation program 124 is a program for causing the control section 100 to recalculate the candidate frequency HC using a fourth accumulation time longer than the first accumulation time utilizing the search channel sections 40a1 and the like when the control section 100 has determined that the candidate frequency HC is not reliable based on the candidate frequency confirmation program 120. The candidate frequency recalculation program 124 and the control section 100 exemplify a candidate reception frequency recalculation section.

Figure 9:
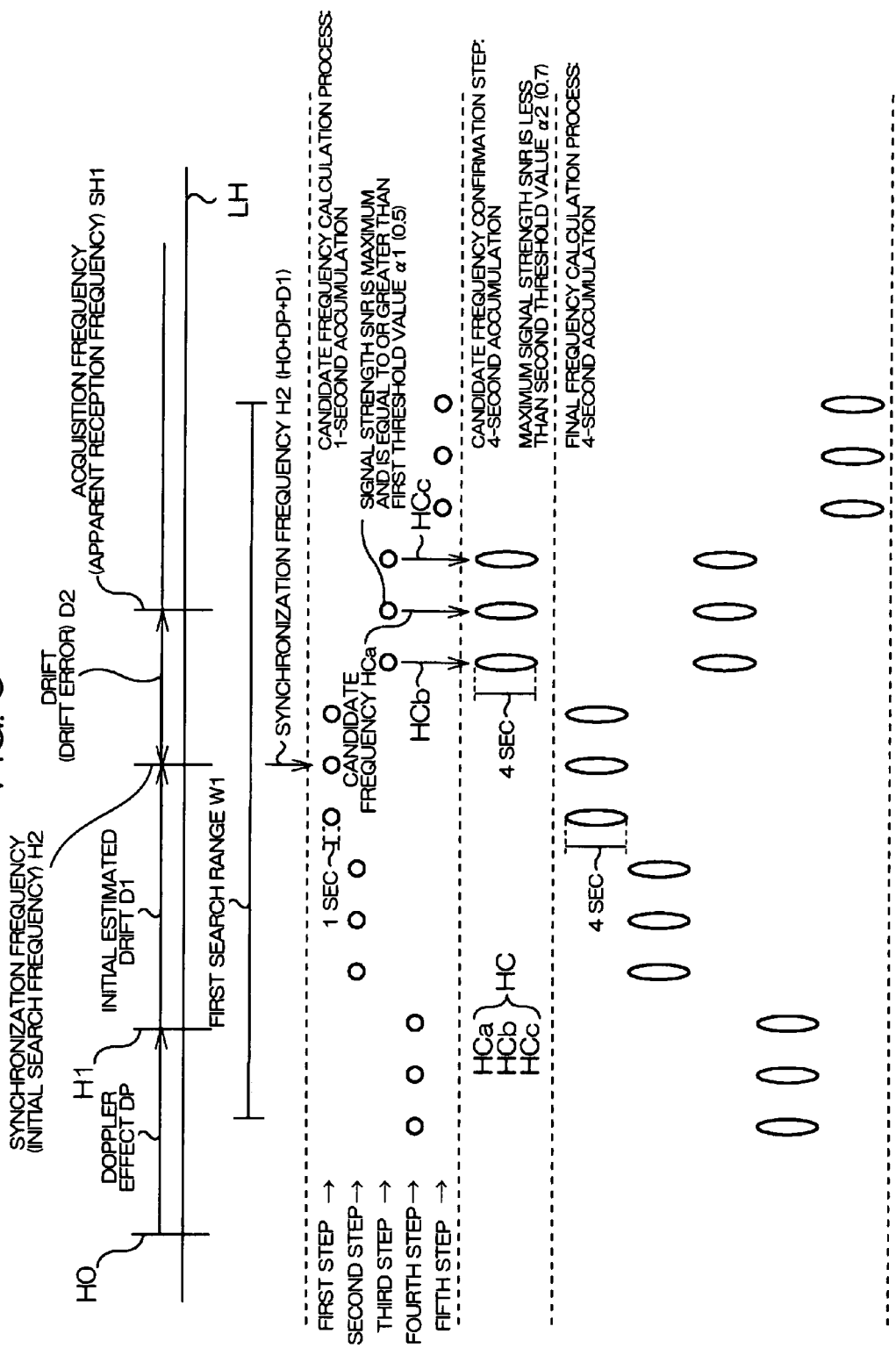

FIG. 9 is a view illustrative of the candidate frequency recalculation program 124.

As shown in FIG. 9, when the maximum SNR measured in the candidate frequency confirmation process is less than the second threshold value α2, the control section 100 searches for the frequency in the first search range W1 using an accumulation time of four seconds. The search center frequency is the synchronization frequency H2.

The candidate frequency HC calculated using an accumulation time of four seconds is more reliable than the candidate frequency HC calculated using an accumulation time of one second.

The control section 100 stores candidate frequency information 162 indicating the recalculated candidate frequency HC in the second storage section 150. In more detail, the control section 100 updates the previously calculated candidate frequency HC with the newly calculated candidate frequency HC. This process is called a candidate frequency recalculation process.

The control section 100 confirms the reliability of the recalculated candidate frequency HC based on the candidate frequency confirmation program 120, and calculates the final frequency HF based on the final frequency calculation program 122.

As shown in FIG. 5, the terminal 30 includes a drift error calculation program 126. The drift error calculation program 126 is a program for causing the control section 100 to calculate the drift error D2 which is the difference between the synchronization frequency corresponding to each GPS satellite 12a, indicated by the synchronization frequency information 160, and the final frequency HF. The drift error calculation program 126 and the control section 100 exemplify a first difference calculation program.

In more detail, the control section 100 calculates the drift error D2a which is the difference between the synchronization frequency H2a and the final frequency HFa of the GPS satellite 12a based on the drift error calculation program 126.

The control section 100 calculates the drift error D2b which is the difference between the synchronization frequency H2b and the final frequency HFb of the GPS satellite 12b, and calculates the drift error D2c which is the difference between the synchronization frequency H2c and the final frequency HFc of the GPS satellite 12c in the same manner as in the process for the GPS satellite 12a.

When the frequency H1 (see FIG. 7) is set to be the initial search frequency, differing from this embodiment, the difference between the final frequency HF and the frequency H1 is the drift error D2. In this case, the drift error D2 indicates the entire drift.

As shown in FIG. 5, the terminal 30 stores an average drift error calculation program 128 in the first storage section 110. The average drift error calculation program 128 is a program for causing the control section 100 to calculate an average drift error Dav which is the average value of the drift errors D2a, D2b, and D2c included in the drift error information 166. The average drift error calculation program 128 and the control section 100 exemplify an average difference calculation section.

The control section 100 stores average drift error information 168 indicating the average drift error Dav in the second storage section 150.

When the first acquisition target satellite is only the GPS satellite 12a, the average drift error Dav is equal to the drift error D2a.

When n (n is a positive integer) first acquisition target satellites have been acquired, a value obtained by dividing sum of the first differences by n is the average drift error Dav.

FIG. 10 is a view illustrative of the average drift error calculation program 128.

As shown in FIG. 10, the control section 100 calculates the average drift error Dav when one of conditions 1 to 4 is satisfied.

The condition 1 is a condition whereby the number of satellites with a signal strength SNR of one is one or more in the one-second accumulation process (candidate frequency calculation process). For example, when only the GPS satellite 12a has a signal strength SNR of one, the average drift error Dav is equal to the drift error D2a. In this case, the control section 100 does not calculate the final frequency HF, so that the difference between the candidate frequency HC with a signal strength SNR of one obtained by the one-second accumulation process and the synchronization frequency H2a is used as the drift error D2a (average drift error Dav).

After calculating the average drift error Dav, the control section 100 terminates the candidate frequency calculation process, the candidate frequency confirmation process, and the final frequency calculation process. The control section 100 calculates the synchronization frequency H2 for each GPS satellite using the average drift error Dav, and acquires each GPS satellite using the synchronization frequency H2. This also applies to conditions 2 to 4 described later.

The condition 2 is a condition whereby the number of satellites with a signal strength SNR of 0.7 or more is two or more in the one-second accumulation process.

The condition 3 is a condition whereby the number of satellites with a signal strength SNR of 0.7 or more is one or more in the four-second accumulation process (candidate frequency confirmation process) and the eight-second accumulation process (final frequency calculation process) has been completed.

The condition 4 is a condition whereby the number of satellites with a signal strength SNR of 0.5 or more is two or more in the four-second accumulation process (candidate frequency confirmation process) and the eight-second accumulation process (final frequency calculation process) has been completed.

As shown in FIG. 5, the terminal 30 stores a necessary-for-positioning satellite acquisition program 130 in the first storage section 110. The necessary-for-positioning satellite acquisition program 130 is a program for causing the control section 100 to acquire the GPS satellite other than the first acquisition target satellites used to calculate the average drift error D2av based on the average drift error information 168 indicating the average drift error D2av. Specifically, the necessary-for-positioning satellite acquisition program 130 and the control section 100 exemplify a necessary-for-positioning satellite acquisition section.

When the drift error D2 has been calculated, the drift error D2 is used to calculate the average drift error D1av. Therefore, the GPS satellite other than the first acquisition target satellites used to calculate the average drift error D2av coincide with the GPS satellite other than the first acquisition target satellites used to calculate the drift error D2.

FIG. 11 is a view illustrative of the necessary-for-positioning satellite acquisition program 130.

As shown in FIG. 11, when the control section 100 has used the GPS satellites 12a, 12b, and 12c to calculate the average drift error D2av, the control section 100 acquires the GPS satellite 12d using the average drift error Dav, for example.

In this case, the control section 100 tracks the GPS satellites 12a, 12b, and 12c (first acquisition target satellites) using the search channel sections 40a1 and the like necessary to track the first acquisition target satellites among the search channel sections 40a1 and the like which can be used, for example. The control section 100 acquires the GPS satellite 12d necessary for positioning using the remaining search channel sections.

For example, when using two search channel sections 40a1 and the like for tracking the GPS satellite 12a, 12b, and 12c (first acquisition target satellites), respectively, six search channel sections 40a1 and the like are required in total. The GPS satellite 12d is acquired using the eleven search channel sections 40a7 to 40a18 excluding the six search channel sections 40a1 to 40a6, for example.

Specifically, the initial search frequency H2d of the GPS satellite 12d is corrected based on the average drift error D2av, and the GPS satellite 12d is sought using a new synchronization frequency after correction.

The control section 100 can calculate the Doppler effect of the signal from GPS satellite 12d using the approximate position information 152 and the satellite orbital information 154 shown in FIG. 5. Since the average drift Dav is information obtained by the GPS device 40, the average drift Dav is also used to search for the GPS satellite 12d other than the GPS satellites 12a, 12b, and 12c. Therefore, the terminal 30 can start searching for the GPS satellite 12d based on the synchronization frequency SH1d (see FIG. 11) estimated to be the frequency of the signal S4 from the GPS satellite 12d at the position of the terminal 30. As described above, since the average drift error Dav is the information obtained by measurement, the average drift error Dav is accurate. Therefore, the synchronization frequency SH1d set based on the average drift error Dav is extremely close to the frequency actually received. Accordingly, the terminal 30 can promptly complete acquisition of the GPS satellite 12d.

Specifically, the GPS satellite 12d can be acquired within a time t of 1, for example. This enables the terminal 30 to promptly acquire the GPS satellite 12d after acquiring the first acquisition target satellites 12a, 12b, and 12c and calculating the average drift error Dav.

Note that the control section 100 may acquire the GPS satellites 12d and the like based on the necessary-for-positioning satellite acquisition program 130, differing from this embodiment.

(Operation Example and the Like of Terminal 30 According to this Embodiment)

The terminal 30 is configured as described above. An operation example of the terminal 30 is described below.

Figure 12:
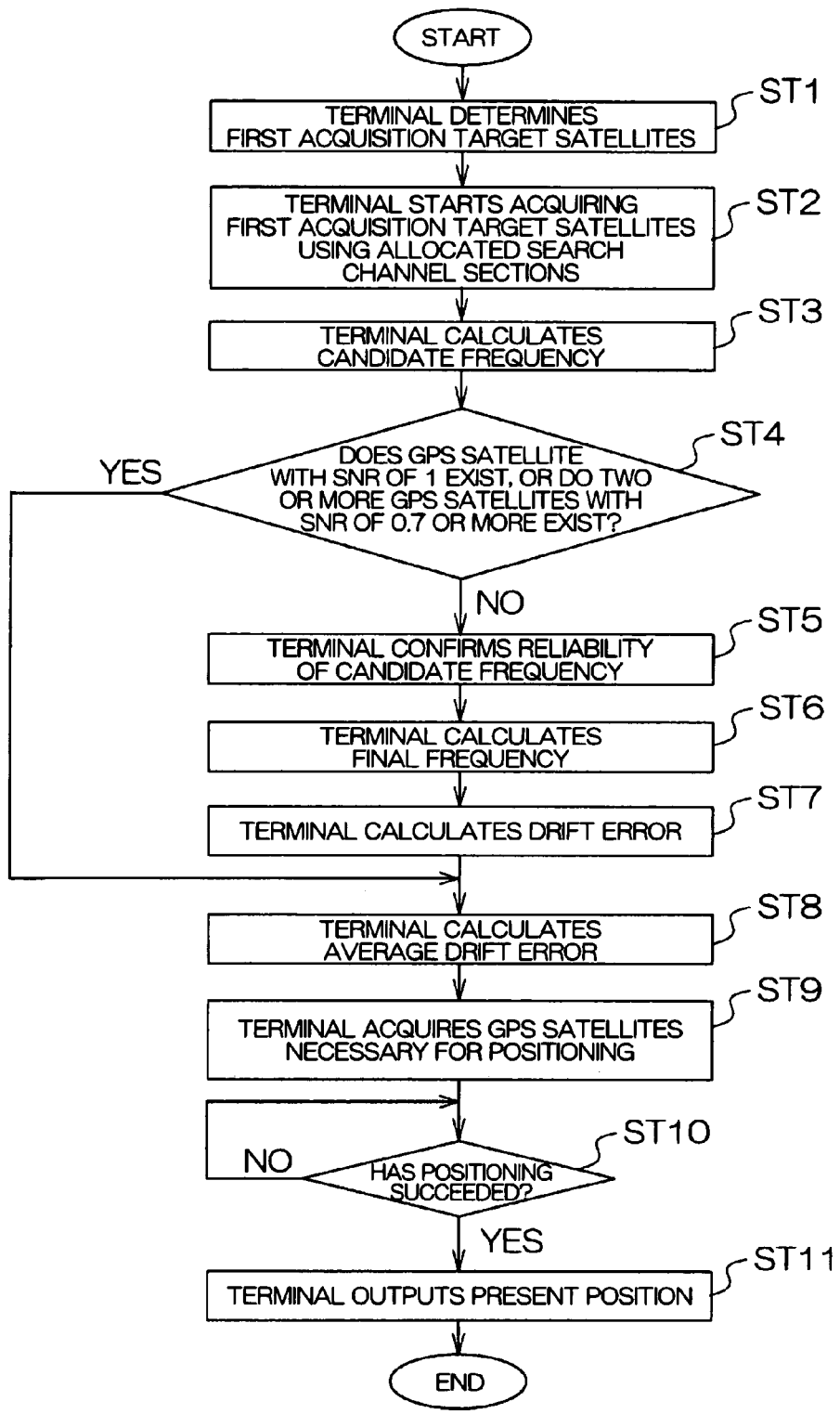
FIG. 12 is a schematic flowchart showing an operation example of the terminal.

FIG. 12 is a schematic flowchart showing an operation example of the terminal 30.

The terminal 30 determines the observable GPS satellites 12a and the like expected to be promptly acquired, such as the GPS satellites 12a, 12b, and 12c, to be the first acquisition target satellites based on the approximate position information 152 and the satellite orbital information 154 (see FIG. 5) (step ST1). The step ST1 exemplifies a first acquisition target satellite determination step.

The terminal 30 starts acquiring the GPS satellites 12a, 12b, and 12c (i.e. first acquisition target satellites) using the allocated search channel sections 40a1 and the like (step ST2).

In the step ST2, the terminal 30 starts the search operation using the frequency calculated based on the initial estimated drift D1 (e.g. drift during the preceding positioning) and the Doppler effect DP as the initial search frequency H2 for the GPS satellites 12a and the like.

The terminal 30 calculates the candidate frequency in a step ST3 (see FIG. 8). The step ST3 exemplifies a candidate frequency calculation step.

The terminal 30 determines whether or not the GPS satellite with a signal strength SNR of 1 exists, or whether or not two or more GPS satellites with a signal strength SNR of 0.7 or more exist (step ST4).

When the terminal 30 has determined that the GPS satellite with a signal strength SNR of 1 exists or two or more GPS satellites with a signal strength SNR of 0.7 or more exist in the step ST4, the terminal 30 calculates the average drift error Dav (step ST8).

When the terminal 30 has determined that the GPS satellite with a signal strength SNR of 1 does not exist and two or more GPS satellites with a signal strength SNR of 0.7 or more do not exist in the step ST3, the terminal 30 confirms the reliability of the candidate frequency in a step ST5 (see FIG. 8). The step ST5 exemplifies a candidate frequency confirmation step.

The terminal 30 calculates the final frequency in a step ST6 (see FIG. 8). The step ST6 exemplifies a final frequency calculation step.

The terminal 30 calculates the drift error D2 (step ST7). The step ST7 exemplifies a first difference calculation step.

The terminal 30 calculates the average drift error D2av (step ST8).

The terminal 30 acquires the GPS satellites necessary for positioning (step ST9). The step ST9 exemplifies a necessary-for-positioning satellite acquisition step.

The terminal 30 determines whether or not positioning has succeeded (step ST10). When the terminal 30 has determined that positioning has succeeded, the terminal 30 outputs the present position (located position) (step ST11).

When the terminal 30 has determined that positioning has not succeeded in the step ST10, the terminal 30 again locates the position.

The above steps allow the terminal 30 to calculate the drift with high accuracy and more promptly acquire the positioning satellite to locate the position.

Since the terminal 30 need not be necessarily provided with data indicating the relationship between the drift amount and the temperature specific to each crystal oscillator and a circuit which measures the temperature, a reduction in circuit scale and cost can be achieved.

Note that the terminal 30 may receive the signals from the GSP satellites 12*a* and the like in a number greater than the number necessary for positioning, and may select the GPS satellites 12*a* and the like with small positioning errors to locate the position, differing from this embodiment.

(Program, Computer-Readable Recording Medium, and the Like)

A program for controlling a terminal device may be provided which causes a computer to execute the first acquisition target satellite determination step, the candidate reception frequency calculation step, the candidate frequency confirmation step, the final frequency calculation step, the first difference calculation step, the necessary-for-positioning satellite acquisition step, and the like in the above-described operation example.

A computer-readable recording medium having such a program for controlling a terminal device recorded thereon and the like may also be provided.

A program storage medium used to install the program for controlling a terminal device and the like in a computer to allow the program and the like to be executable by the computer may be implemented by a packaging medium such as a flexible disk such as a Floppy Disk (registered trademark), a compact disc read only memory (CD-ROM), a compact disc-recordable (CD-R), a compact disc-rewritable (CD-RW), or a digital versatile disc (DVD), a semiconductor memory, a magnetic disk, or a magnetooptical disk in which the program is stored temporarily or permanently, or the like.

The invention is not limited to the above embodiments. The above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A terminal device that locates a present position based on signals from a plurality of positioning satellites, the terminal device comprising:
   a plurality of search channel sections that search for the positioning satellite while changing an accumulation time of a correlation accumulation process for the signal from the positioning satellite;
   a first acquisition target satellite determination section that determines a first acquisition target satellite;
   a candidate reception frequency calculation section that calculates a frequency with a signal strength that is equal to or greater than a first threshold value as a candidate reception frequency of the first acquisition target satellite by causing the search channel sections to perform the correlation accumulation process using a first accumulation time within a first frequency search range;
   a determination section that determines whether or not the signal strength is equal to or greater than a second threshold value that is larger than the first threshold value by causing the search channel sections sot perform the correlation accumulation process corresponding to the candidate reception frequency using a second accumulation time being longer than the first accumulation time;
   a final frequency calculation section that calculates a frequency with the maximum signal strength as a final frequency when the determination section has determined that the signal strength is equal to or greater than the second threshold value by causing the search channel sections to perform the correlation accumulation process using a third accumulation time that is longer than the second accumulation time within a second frequency search range that includes the candidate reception frequency and is narrower than the first frequency search range;
   a drift error calculation section that calculates a drift error from a difference between an estimated synchronization frequency of the first acquisition target satellite and the final frequency; and
   a necessary-for-positioning satellite acquisition section that corrects a search frequency of each of the plurality of positioning satellites using the drift error, and acquires the positioning satellite in a number necessary for positioning.

2. The terminal device as defined in claim 1, further comprising
   a candidate reception frequency recalculation section that recalculates a frequency with a signal strength that is equal to or greater than the first threshold value as the candidate reception frequency of the first acquisition target satellite when the determination section has determined that the signal strength is not equal to or greater than the second threshold value by causing the search channel sections to perform the correlation accumulation process using a fourth accumulation time that is longer than the first accumulation time within the first frequency search range.

3. The terminal device as defined in claim 1, wherein
   the first acquisition target satellite determination section determines a plurality of the first acquisition target satellites.

4. The terminal device as defined in claim 1, wherein
   the first acquisition target satellite determination section determines a plurality of the first acquisition target satellites;
   the drift error calculation section calculates the drift error for each of the plurality of first acquisition target satellites,
   the terminal device includes an average calculation section that calculates an average value of the drift errors calculated for the plurality of the first acquisition target satellites, and
   the necessary-for-positioning satellite acquisition section acquires the positioning satellite using the average value of the drift errors calculated by the average calculation section.

5. A positioning method of locating a present position based on signals from a plurality of positioning satellites by searching for the positioning satellites using a plurality of search channel sections that search for the positioning satellite while changing an accumulation time of a correlation accumulation process for the signal from the positioning satellite, the method comprising:
   a first acquisition target satellite determination step of determining a first acquisition target satellite;

a candidate reception frequency calculation step of calculating a frequency with a signal strength that is equal to or greater than a first threshold value as a candidate reception frequency of the first acquisition target satellite by causing the search channel sections to perform the correlation accumulation process using a first accumulation time within a first frequency search range;

a determination step of whether or not the signal strength is equal to or greater than a second threshold value that is longer than the first threshold value by causing the search channel sections to perform the correlation accumulation process corresponding to the candidate reception frequency using a second accumulation time that is longer than the first accumulation time;

a final frequency calculation step of calculating a frequency with the maximum signal strength as a final frequency when it has been determined that the signal strength is equal to or greater than the second threshold value by causing the search channel sections to perform the correlation accumulation process using a third accumulation time that is longer than the second accumulation time within a second frequency search range that includes the candidate reception frequency and is narrower than the first frequency search range;

a drift error calculation step of calculating a drift error from a difference between an estimated synchronization frequency of the first acquisition target satellite and the final frequency; and a necessary-for-positioning satellite acquisition step of correcting a search frequency of each of the plurality of positioning satellites using the drift error, and acquiring positioning satellites in a number necessary for positioning.

6. A computer-readable recording medium having recoded thereon a program for causing a computer to locate a present position based on signals from a plurality of positioning satellites by causing a plurality of search channel sections to search for the positioning satellites while changing an accumulation time of a correlation accumulation process for the signal from the positioning satellite, the program causing the computer to execute:

a first acquisition target satellite determination step of determining a first acquisition target satellite;

a candidate reception frequency calculation step of calculating a frequency with a signal strength that is equal to or greater than a first threshold value as a candidate reception frequency of the first acquisition target satellite by causing the search channel sections to perform the correlation accumulation process using a first accumulation time within a first frequency search range;

a determination step of determining whether or not the signal strength is equal to or greater than a second threshold value that is larger than the first threshold value by causing the search channel sections to perform the correlation accumulation process corresponding to the candidate reception frequency using a second accumulation time that is longer than the first accumulation time;

a final frequency calculation step of calculating a frequency with the maximum signal strength as a final frequency when it has been determined that the signal strength is equal to or greater than the second threshold value by causing the search channel sections to perform the correlation accumulation process using a third accumulation time that is longer than the second accumulation time within a second frequency search range that includes the candidate reception frequency and is narrower than the first frequency search range;

a drift error calculation step of calculating a drift error from a difference between an estimated synchronization frequency of the first acquisition target satellite and the final frequency; and a necessary-for-positioning satellite acquisition step of correcting a search frequency of each of the plurality of positioning satellites using the drift error, and acquiring the positioning satellites in a number necessary for positioning.

* * * * *